(12) United States Patent
Shigemitsu

(10) Patent No.: US 10,839,482 B2
(45) Date of Patent: Nov. 17, 2020

(54) INFORMATION PROCESSING APPARATUS, IMAGE DISPLAY METHOD, DISPLAY SYSTEM, AND COMPUTER READABLE STORAGE MEDIUM

(71) Applicant: SEIKO EPSON CORPORATION, Tokyo (JP)

(72) Inventor: Makoto Shigemitsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 15/925,135

(22) Filed: Mar. 19, 2018

(65) Prior Publication Data

US 2018/0276791 A1   Sep. 27, 2018

(30) Foreign Application Priority Data

Mar. 23, 2017  (JP) ................. 2017-057145

(51) Int. Cl.
*G06T 3/40* (2006.01)
*G06T 11/00* (2006.01)
*H04N 5/232* (2006.01)
*H04N 9/31* (2006.01)
*H04N 21/41* (2011.01)

(52) U.S. Cl.
CPC ............. *G06T 3/40* (2013.01); *G06T 11/00* (2013.01); *H04N 5/232* (2013.01); *H04N 9/3179* (2013.01); *H04N 21/4122* (2013.01)

(58) Field of Classification Search
CPC ....... G06T 11/00; G06T 3/40; H04N 21/4122; H04N 5/232; H04N 9/3179
See application file for complete search history.

(56) References Cited

U.S. PATENT DOCUMENTS

| 6,313,877 B1* | 11/2001 | Anderson | G09G 5/005 |
| | | | 348/333.05 |
| 2015/0109464 A1* | 4/2015 | Seo | H04N 1/00209 |
| | | | 348/207.1 |

(Continued)

FOREIGN PATENT DOCUMENTS

| JP | H10-79913 A | 3/1998 |
| JP | 2004-361814 A | 12/2004 |

(Continued)

*Primary Examiner* — Manuchehr Rahmjoo
(74) *Attorney, Agent, or Firm* — Oliff PLC

(57) ABSTRACT

An information processing apparatus includes a thumbnail image generator that generates thumbnail image from content data formed of a plurality of pages, an instruction accepting section that accepts a page switching instruction, a rendering processor that generates image data to be displayed by a projector apparatus connected to the information processing apparatus, a communication section that communicates with the projector apparatus, and a controller that controls generation of data to be transmitted to the projector apparatus. The controller determines, upon acceptance of the switching instruction, the thumbnail image, transmits thumbnail image data representing the determined thumbnail image to the projector apparatus via the communication section, and then transmits high-resolution image data corresponding to the thumbnail image to the projector apparatus via the communication section.

8 Claims, 6 Drawing Sheets

(56) References Cited

U.S. PATENT DOCUMENTS

| | | | |
|---|---|---|---|
| 2015/0370526 A1 | 12/2015 | Inagaki | |
| 2016/0360160 A1* | 12/2016 | Eizenberg | ......... G06Q 30/0207 |
| 2017/0255443 A1 | 9/2017 | Inagaki | |

FOREIGN PATENT DOCUMENTS

| | | |
|---|---|---|
| JP | 2007-124080 A | 5/2007 |
| JP | 2008-11480 A | 1/2008 |
| JP | 2010-211423 A | 9/2010 |
| JP | 2016-09023 A | 1/2016 |

* cited by examiner

INFORMATION PROCESSING APPARATUS, IMAGE DISPLAY METHOD, DISPLAY SYSTEM, AND COMPUTER READABLE STORAGE MEDIUM

CROSS-REFERENCE

The entire disclosure of Japanese Patent Application No. 2017-057145, filed Mar. 23, 2017 is expressly incorporated by reference herein.

BACKGROUND

1. Technical Field

The present invention relates to an information processing apparatus, an image display method, a display system, and a computer readable storage medium.

2. Related Art

There is a known display system of related art in which image data held by a terminal apparatus is transmitted to a display apparatus and the display apparatus displays an image based on the received image data, as shown in JP-A-2016-9023.

Further, there is a known quick image display technology for first causing a display apparatus to display a low-resolution image and then causing the display apparatus to display a high-resolution image in place of the low-resolution image, as shown in JP-A-2004-361814 and JP-A-10-79913.

However, in a case where the terminal apparatus generates image data and the generated image data is transmitted to the display apparatus only after the generation of the image data is completed, and if it takes a long time to complete the generation of the image data, the state in which the display apparatus displays no image continues, and the no image display state causes a user's wrong operation, resulting in a decrease in user friendliness.

SUMMARY

An advantage of some aspects of the invention is to achieve quick response to an instruction of switching a displayed image.

The invention can be implemented as the following forms or application examples.

Application Example 1

An information processing apparatus according to this application example is an information processing apparatus communicably connected to an image display apparatus, the information processing apparatus including a thumbnail image generator that generates a thumbnail image from content data formed of a plurality of pages, an accepting section that accepts a page switching instruction, a high-resolution image data generator that generates high-resolution image data having resolution higher than resolution of the thumbnail image, a communication section that communicates with the image display apparatus, and a controller that controls generation of data to be transmitted to the image display apparatus, and the controller determines, upon acceptance of the switching instruction, the thumbnail image based on the switching instruction, transmits thumbnail image data representing the determined thumbnail image to the image display apparatus via the communication section, and transmits, upon the transmission of the thumbnail image data, the resolution image data to the image display apparatus via the communication section.

The thus configured information processing apparatus, when it accepts the page switching instruction, first transmits thumbnail image data representing a thumbnail image determined based on the switching instruction to the image display apparatus, then generates high-resolution image data having resolution higher than that of the thumbnail image, and transmits the generated high-resolution image data to the image display apparatus. The image display apparatus can therefore display the first received thumbnail image data for the period from the reception of the thumbnail image data to the reception of the high-resolution image data having higher resolution, so that a user can visually recognize that the page switching instruction has been accepted, whereby the user's wrong operation can be avoided, and user friendliness can therefore be improved.

Application Example 2

In the information processing apparatus according to the application example described above, it is preferable that the accepting section acquires the switching instruction from an external apparatus.

According to the configuration described above, the external apparatus can instruct the image display apparatus to switch a projected image to another.

Application Example 3

In the information processing apparatus according to the application example described above, the external apparatus may be a remote control.

Application Example 4

It is preferable that the information processing apparatus according to the application example described above further includes a storage that stores the thumbnail image and the thumbnail image data, and that the controller reads the thumbnail image and the thumbnail image data stored in the storage.

According to the configuration described above, generating thumbnail image and thumbnail image data and storing them in the storage allow the thumbnail image and the thumbnail image data to be quickly read and used as required.

Application Example 5

In the information processing apparatus according to the application example described above, it is preferable that the controller evaluates whether or not the thumbnail image data is transmitted to the image display apparatus based on a period required to generate the high-resolution image data.

According to the configuration described above, the high-resolution image data can be transmitted to the image display apparatus based on the period required to generate the high-resolution image data without transmission of the thumbnail image data to the image display apparatus.

Application Example 6

A computer readable recording medium according to this application example is a computer readable recording medium that records a program executable by a computer that causes an image display apparatus communicably connected to the computer to display an image, the program causing the computer to perform the functions of generating a thumbnail image from content data formed of a plurality of pages, accepting a page switching instruction, determining the thumbnail image based on the switching instruction and transmitting thumbnail image data corresponding to the determined thumbnail image to the image display apparatus, and generating, upon the transmission of the thumbnail image data, high-resolution image data having resolution higher than resolution of the thumbnail image and transmitting the generated high-resolution image data to the image display apparatus.

The function described above allows, when the page switching instruction is accepted, first transmission of thumbnail image data representing a thumbnail image determined based on the switching instruction to the image display apparatus, then generation of high-resolution image data having resolution higher than that of the thumbnail image, and transmission of the generated high-resolution image data to the image display apparatus. The image display apparatus can therefore display the first received thumbnail image data for the period from the reception of the thumbnail image data to the reception of the high-resolution image data having higher resolution, so that the user can visually recognize that the page switching instruction has been accepted, whereby the user's wrong operation can be avoided, and the user friendliness can therefore be improved.

Application Example 7

An image display method according to this application example is an image display method for causing a communicably connected image display apparatus to display an image, the method including generating a thumbnail image from content data formed of a plurality of pages, determining, upon acceptance of a page switching instruction, the thumbnail image based on the switching instruction, transmitting thumbnail image data corresponding to the determined thumbnail image to the image display apparatus, after transmitting the thumbnail image data, generating the image data having higher resolution than that of the thumbnail image, and transmitting the generated imaged data having higher resolution to the image display apparatus.

The method described above allows, when the page switching instruction is accepted, first transmission of thumbnail image data representing a thumbnail image determined based on the switching instruction to the image display apparatus, then generation of high-resolution image data having resolution higher than that of the thumbnail image, and transmission of the generated high-resolution image data to the image display apparatus. The image display apparatus can therefore display the first received thumbnail image data for the period from the reception of the thumbnail image data to the reception of the high-resolution image data having higher resolution, so that the user can visually recognize that the page switching instruction has been accepted, whereby the user's wrong operation can be avoided, and the user friendliness can therefore be improved.

Application Example 8

A display system according to this application example is a display system including an information processing apparatus and an image display apparatus capable communicating with the information processing apparatus, the information processing apparatus including a thumbnail image generator that generates a thumbnail image from content data formed of a plurality of pages, an accepting section that accepts a page switching instruction, a high-resolution image data generator that generates high-resolution image data having resolution higher than resolution of the thumbnail image, a transmitter that transmits image data to the image display apparatus, and a controller that determines, when the accepting section accepts the switching instruction, the thumbnail image based on the switching instruction, transmits thumbnail image data representing the determined thumbnail image to the image display apparatus via the transmitter, and transmits, upon the transmission of the thumbnail image data, the high-resolution image data to the image display apparatus via the transmitter, and the image display apparatus including a receiver that receives the image data from the information processing apparatus and a display section that displays an image based on the received image data.

The thus configured information processing apparatus, when it accepts the page switching instruction, first transmits thumbnail image data representing a thumbnail image determined based on the switching instruction to the image display apparatus, then generates high-resolution image data having resolution higher than that of the thumbnail image, and transmits the generated high-resolution image data to the image display apparatus. The image display apparatus therefore displays the image based on the first received thumbnail image data until an image based on the high-resolution image data is displayed. The user can therefore recognize that the page switching instruction has been accepted by recognizing the image base on the thumbnail image data, whereby the user's wrong operation can be avoided, and the user friendliness can therefore be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Embodiment

Figure 1:
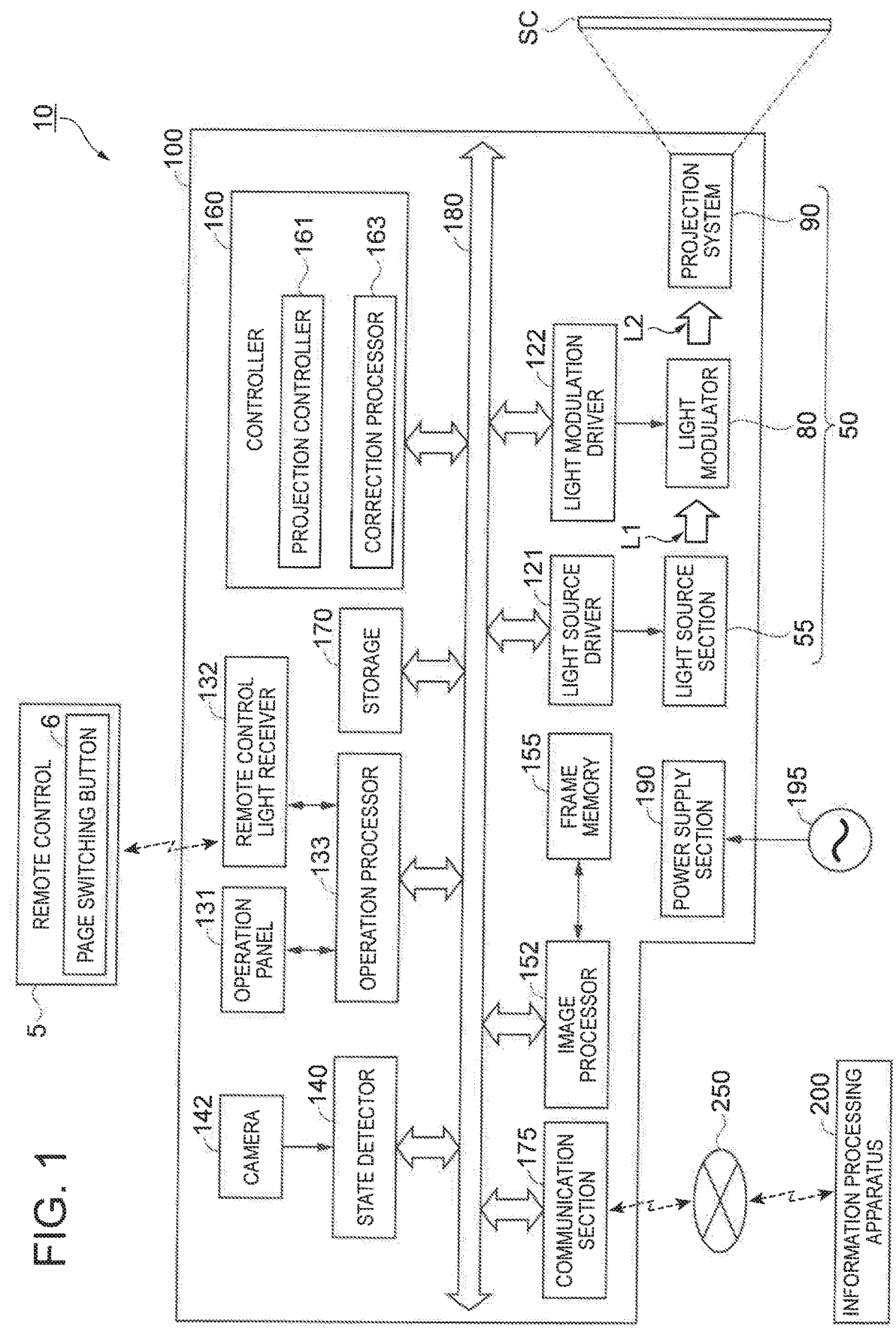
FIG. 1 shows the configuration of an image display system.

An embodiment of the invention will be described below with reference to the drawings. FIG. 1 shows the configuration of an image display system 10.

The image display system 10 includes a projector apparatus 100 as an image display apparatus and an information processing apparatus 200. The projector apparatus 100 and the information processing apparatus 200 are communicably connected to each other.

The projector apparatus 100 projects an image based on image data supplied from the information processing apparatus 200 on a screen SC.

The projector apparatus 100 includes a communication section 175. In the present embodiment, the communication section 175 includes a communication interface compliant with a wireless LAN, such as Wi-Fi (registered trademark), or Bluetooth (registered trademark) and is connected to the information processing apparatus 200 via a network 250.

The interface provided in the communication section 175 may instead comply with Ethernet (registered trademark), IEEE 1394, HDMI (registered trademark), USB, or any other wired connection standard.

The communication section 175 functions as a receiver that receives image data from the information processing apparatus 200, which is connected to the communication section 175. The image data received by the communication section 175 is sent to an image processor 152. The communication section 175 further transmits a variety of pieces of data to the information processing apparatus 200, which is connected to the communication section 175.

The projector apparatus 100 includes an image projecting section. 50, which forms an optical image and projects (displays) the image on the screen SC. The image projecting section 50 functions as a display section and includes a light source section 55 as a light source, a light modulator 80, and a projection system 90.

The light source section 55 is driven by a light source driver 121. The light source driver 121 is connected to an internal bus 180. The light source driver 121 turns on and off a light source of the light source section 55 under the control of a controller 160. When the light source is turned on, output light L1, which is first light, is incident on the light modulator 80.

A light modulation driver 122, which drives liquid crystal devices 85 in the light modulator 80, is connected to the light modulator 80. The light modulation driver 122 is connected to the internal bus 180.

The light modulation driver 122 produces R, G, and B image signals based on display image data inputted from the image processor 152. The light modulation driver 122 drives, based on the produced R, G, and B image signals, the corresponding liquid crystal devices 85 in the light modulator 80 to draw images on liquid crystal devices 85R, 85G, and 85B.

The projection system 90 includes a lens group that projects image light L2, which is second light that is the output light L1 modulated by the light modulator 80, toward the screen SC to form an image on the screen SC. The projection system 90 may further include a zoom mechanism that enlarges and reduces an image to be projected on the screen SC and performs focal point adjustment and focus adjustment mechanism that performs focus adjustment.

The optical system of the image projection of section 50 will be described later in detail.

The projector apparatus 100 includes an operation panel 131 and an operation processor 133. The operation processor 133 is connected to the internal bus 180.

The operation panel 131, which accepts a user's operation, displays a display screen formed of a variety of operation keys and the image drawn on the liquid crystal devices 85. When any of the operation keys displayed on the operation panel 131 is operated, the operation processor 133 outputs data corresponding to the operated key to the controller 160. The operation processor 133 further displays a variety of screens on the operation panel 131 under the control of the controller 160.

A touch sensor that detects contact with the operation panel 131 may be overlaid on and integrated with the operation panel 131. The operation processor 133 detects the position on the operation panel 131 with which the user's finger or any other object has come into contact as an input position and outputs data corresponding to the detected input position to the controller 160.

The projector apparatus 100 further accepts a variety of action instructions from a remote control 5 operated by the user. In the present embodiment, the remote control 5 is an external apparatus separate from the projector apparatus 100 and includes a page switching button 6. For example, in a case where the projector apparatus 100 projects a content displayed on a page basis, and the user presses the page switching button 6, the projector apparatus 100 changes the page being projected to the preceding page or the following page in accordance with the pressed page switching button 6.

The projector apparatus 100 includes a remote control light receiver 132, which receives an infrared signal transmitted from the remote control 5 used by the user. The remote control light receiver 132 is connected to the operation processor 133.

The remote control light receiver 132 receives the infrared signal transmitted from the remote control 5. The operation processor 133 decodes the infrared signal received by the remote control light receiver 132 to generate data representing the content of the operation performed on the remote control 5 and outputs the data to the controller 160.

The projector apparatus 100 includes state detector 140. A signal outputted from a camera 142, which is built in the projector apparatus 100, is inputted to the state detector 140.

The state detector 140 produces state information representing the state of the projector apparatus 100 based on the inputted signal and outputs the state information to the controller 160.

The camera 142 includes an imaging optical system, an imaging device, such as a CCD, an interface circuit, and other components and captures an image of the screen SC on which a projection image is projected and the surroundings of the screen SC, that is, captures an image of objects present in the projection direction of the projection system 90. The camera 142 outputs image data signal on the captured projection image to the state detector 140.

The projector apparatus 100 includes an image processing system. The image processing system is primarily formed of the controller 160, which oversees and controls the entire projector apparatus 100, and further includes the image processor 152, a frame memory 155, and a storage 170. The controller 160, the image processor 152, and the storage 170 are connected to the internal bus 180.

The image processor 152 develops the image data inputted from the communication section 175 in the frame memory 155 under the control of the controller 160. The image processor 152 performs trapezoidal correction and other types of shape correction, digital zooming, adjustment of the color tone and brightness of an image, and other types of image processing on the image data developed in the frame memory 155. The image processor 152 performs processing specified by the controller 160 and further performs as necessary the processing using a parameter inputted from the controller 160. The image processor 152 can, of course, perform a plurality of the types of processing described above it combination.

The image processor 152 reads the processed image data from the frame memory 155 and outputs the image data as display image data to the light modulation driver 122.

The controller 160 includes a CPU (central processing unit), a ROM (read only memory), a RAM (random access memory), and other types of hardware, none of which is shown. The ROM is a nonvolatile storage device, such as a flash ROM, and stores a control program and data. The RAM forms a work area used by the CPU. The CPU develops the control program read from the ROM or the storage 170 in the RAM and executes the control program developed in the RAM to control each portion of the projector apparatus 100.

The controller 160 controls execution of each function based on an operation content sent from the remote control 5. In a case where the operation content sent from the remote control 5 is operation to be performed on the information processing apparatus 200, the controller 160 generates data representing the operation content and transmits the data via the communication section 175 to the information processing apparatus 200.

The controller 160 further includes a projection controller 161 and a correction processor 163 as functional blocks. The functional blocks are achieved when the CPU and the control program stored in the ROM or the storage 170, neither of them is shown, cooperate with each other.

The storage 170 is a nonvolatile storage device and is achieved, for example, by a flash memory, an EPROM (erasable programmable ROM), an EEPROM (electrically EPROM), an HDD (hard disc drive), or any other storage device. The storage 170 stores image data projected by the image projecting section 50 on the screen SC, data and parameters to which the controller 160 refers, and other pieces of information.

The projection controller 161 adjusts the image display aspect of the image projecting section 50 and controls the projection of an image on the screen SC.

Specifically, the projection controller 161 controls the image processor 152 to cause it to perform image processing on drawing data received by the communication section 175. In this process, the projection controller 161 may read a parameter necessary for the processing performed by the image processor 152 and output the parameter to the image processor 152.

The projection controller 161 further controls the light source driver 121 to cause it to turn on the light source of the light source section 55 and instruct the light source section 55 about the luminance of the light source.

The correction processor 163 performs correction based on the state information outputted from the state detector 140.

For example, in a case where the state information shows inclination of the projector apparatus 100, the correction processor 163 instructs the image processor 152 to perform trapezoidal correction.

A power supply section 190 converts electric power supplied from an external power supply 195 into electric power having predetermined characteristic values and supplies each functional portion with the electric power.

Figure 2:
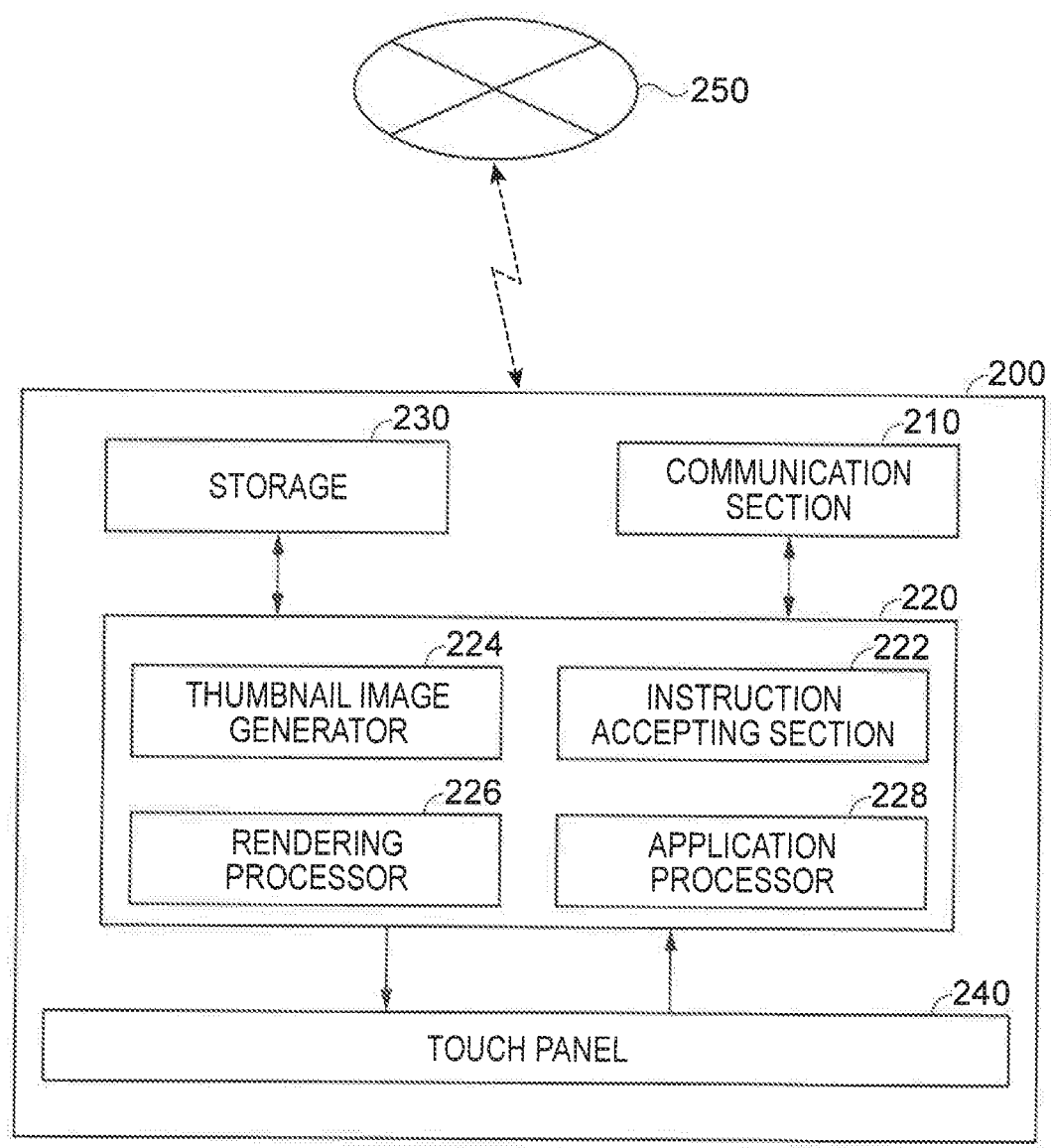
FIG. 2 shows the configuration of an information processing apparatus.

FIG. 2 is a configuration diagram showing the configuration of the information processing apparatus 200 connected to the projector apparatus 100.

The information processing apparatus 200 includes a communication section 210, a storage 230, a controller 220, and a touch panel 240.

In the present embodiment, the information processing apparatus 200 is assumed, for example, to be a smartphone or any other mobile phone having advanced functions or a tablet terminal or any other multi-functional mobile terminal.

The communication section 210 transmits and receives data to and from the projector apparatus 100 over wireless communication. For example, the communication section 210 functions as a transmitter that transmits image data to projected by the projector apparatus 100.

The storage 230 stores content data expressed in a file format representing an image or a document and data on programs, such as applications executable by the information processing apparatus 200. The applications are assumed to be an operation program for operating the projector apparatus 100 and an application program for achieving a predetermined function. In the present embodiment, the storage 230 is assumed, for example, to be a flash memory.

The touch panel 240 displays an image containing a user interface for an application program and accepts the user's instruction performed on the user interface.

The controller 220 controls the action of each of the functional portions of the information processing apparatus 200.

The controller 220 includes an instruction accepting section 222, a thumbnail image generator 224, a rendering processor 226, and an application processor 228 as functional blocks.

The instruction accepting section 222 analyzes the content of operation performed on the remote control 5 and received by the communication section 175 and accepts an instruction based on the content of the operation. The instruction can be assumed, for example, to be operation performed on a document projected by the projector apparatus 100. The controller 220 instructs each of the functional portions about a predetermined action based on the accepted instruction.

In the present embodiment, the operation content from the remote control 5 is acquired via the projector apparatus 100. Instead, it can be assumed that the information processing apparatus 200 directly receives the operation content from the remote control 5, and that the information processing apparatus 200 accepts an instruction from an external apparatus by using a short-range radio wave, such as Bluetooth (registered trademark).

The application processor 228 executes an application program and instructs the application program being executed about predetermined operation based on an instruction from the controller 220. In the present embodiment, the application program is assumed to be an image display program that displays a content (document) written, for example, in the PDF (portable document format) and causes the projector apparatus 100 to project a desired page, but not limited thereto.

The thumbnail image generator 224 generates a low-resolution thumbnail image from content data based on an instruction from the controller 220. The data on the generated thumbnail image (thumbnail data) is stored in the storage 230.

The rendering processor 226 performs rendering of content data stored in the storage 230 to generate image data (drawing data) to be projected by the projector apparatus 100 based on an instruction from the controller 220.

To generate drawing data, the rendering processor 226 has the function of generating drawing data on a low-resolution thumbnail image from the thumbnail data and the function generating drawing data on a high-resolution image corresponding to the thumbnail image from the thumbnail data based on an instruction from the controller 220. The function of generating drawing data having resolution higher than the resolution of the thumbnail image corresponds to a high-resolution image data generator.

In the present embodiment, when content data expressed in a file format used in the image display program is determined, the thumbnail image generator 224 produces a predetermined number of thumbnail images at the maximum. Further, the rendering processor 226 performs rendering of the generated thumbnail images as background processing to generate drawing data. The generated thumbnail images and drawing data are stored in the storage 230.

The controller 220 may, for example, be achieved by a computer including a CPU, a RAM, a ROM, and other components, none of which is shown. The computer may include a variety of dedicated processing circuits, such as an image processing circuit. The controller 220 may instead be achieved, for example, by an ASIC (application specific integrated circuit).

Each of the functions of the controller 220 represents a functional configuration achieved by cooperation between hardware and software and is not necessarily implemented in specific form. Therefore hardware corresponding to each of the functional portions is not necessarily implemented, and a single processor that executes a program can, of course, achieve the functions of the plurality of functional portions. Further, in the embodiment described above, part of the functions achieved by software may be achieved by hardware, or part of the functions achieved by hardware may be achieved by software.

Figure 3:
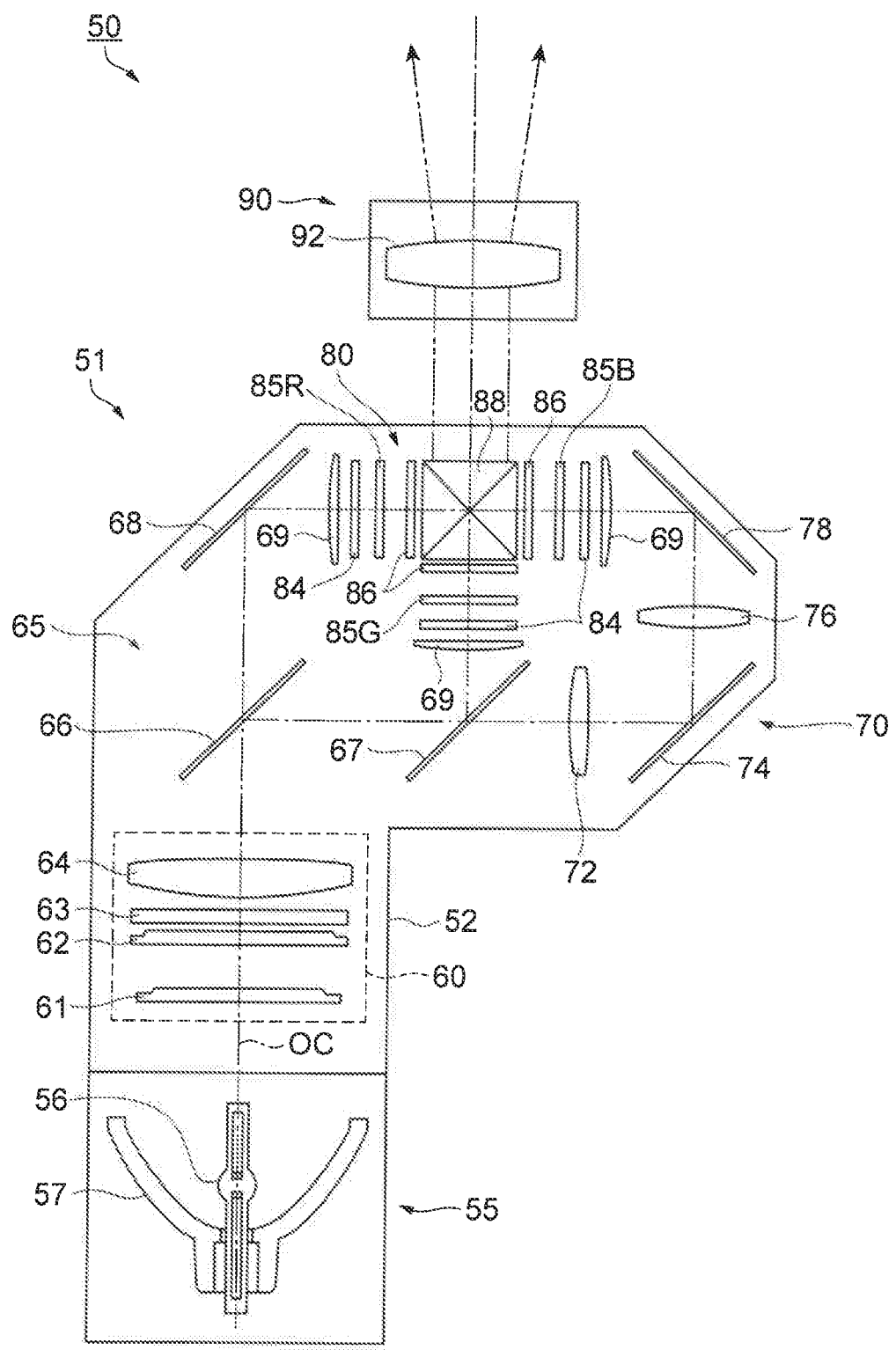
FIG. 3 diagrammatically shows the optical system of an image projection section.

FIG. 3 diagrammatically shows the optical system of the image projecting section 50, and a schematic configuration of the optical system will next be described with reference to FIG. 3.

The optical system of the image projecting section 50 is configured in an optical unit 51. The optical unit 51 includes an optical part enclosure 52, the light source section 55, an illumination optical apparatus 60, a color separation optical apparatus 65, a relay optical apparatus 70, the light modulator 80, and the projection system 90. Optical parts that form each of the components that form the optical unit 51 are accommodated in the optical part enclosure 52.

The light source section 55 includes an arc tube 56, which outputs light fluxes, and a reflector 57. In the light source section 55, the light fluxes outputted from the arc tube 56 are so reflected off the reflector 57 that the output directions of the light fluxes are aligned with one another, and the resultant single light flux outputted toward the illumination optical apparatus 60. An illumination optical axis OC is the center axis of the light flux outputted from the light source section 55 toward an area to be illuminated.

The illumination optical apparatus 60 includes lens arrays 61 and 62, a polarization conversion element 63, a superimposing lens 64, and field lenses 69 and has the function of homogenizing the illuminance of the light flux outputted from the light source section 55 in a plane perpendicular to the illumination optical axis OC.

The color separation optical apparatus 65 includes dichroic mirrors 66 and 67 and a reflection mirror 68, separates the light flux outputted from the illumination optical apparatus 60 into three color light fluxes, red (R) light, green (G) light, and blue (B) light, and guides them to the three liquid crystal devices 85R, 85G, and 85B. In the present embodiment, the liquid crystal devices 85R, 85G, and 85B are each a transmissive liquid crystal panel.

The relay optical apparatus 70 includes a light-incident-side lens 72, a relay lens 76, and reflection mirrors 74 and 78. Since the optical path of the color light flux separated by the color separation optical apparatus 65 (B light in present embodiment) is longer than the optical paths of the other color light fluxes, the relay optical apparatus 70 prevents a decrease in light use efficiency due, for example, to light divergence and guides the separated color light flux to the corresponding liquid crystal device 85 (liquid crystal device 85B in present embodiment).

The light modulator 80 includes three light-incident-side polarizers 84, the three liquid crystal devices 85R, 85G, and 85B, three light-exiting-side polarizers 86, and a cross dichroic prism 88. The liquid crystal devices 85R, 85G, and 85B modulate the color light fluxes separated by the color separation optical apparatus 65 in accordance with image signals. The cross dichroic prism 88 combines the color light fluxes modulated by the liquid crystal devices 85R, 85G, and 85B with one another and outputs the combined color light toward the projection system 90.

The projection system 90 include a projection lens 92, and the projection lens 92 enlarges the light fluxes modulated by the light modulator 80 and combined with one another and projects the combined light on the screen SC. A projection image based on the image signals is thus displayed on the screen SC.

Figure 4:
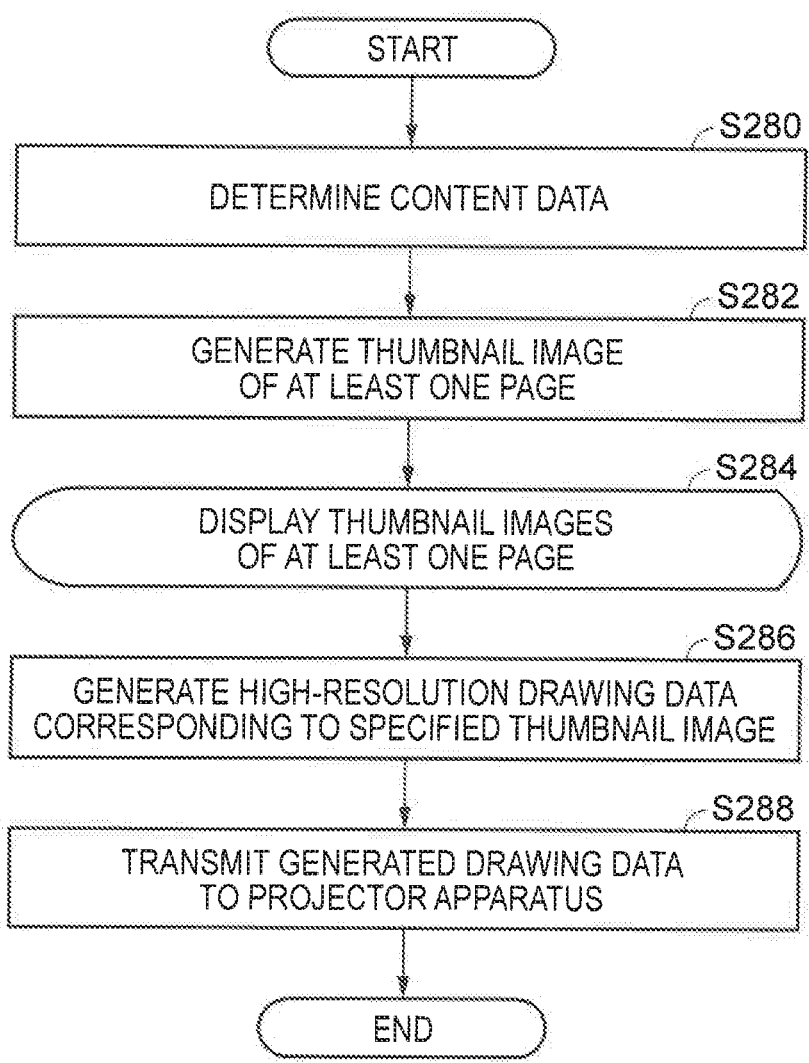
FIG. 4 is a flowchart showing the procedure of an activation process.

FIG. 4 is a flowchart showing the procedure of a process carried out when the information processing apparatus 200 is activated and the image display program that displays a document on a page basis is activated (activation process).

When the information processing apparatus 200 is activated and the image display program is executed, the controller 220 of the information processing apparatus 200 determines content data, such as an image file (step S280). The determination may be made by the user, or content data read last time by the information processing apparatus 200 may be determined as the content data.

The controller 220 of the information processing apparatus 200 then generates low-resolution thumbnail images of at least one page from the content data (step S282). The data on the generated thumbnail images is stored in the storage 230. The controller 220 of the information processing apparatus 200 starts rendering performed on the generated thumbnail images as background processing.

The controller 220 of the information processing apparatus 200 displays the plurality of generated thumbnail images on the touch panel 240 (step S284).

The controller 220 of the information processing apparatus 200 then accepts an instruction from the user and generates high-resolution drawing data corresponding to a thumbnail image specified by the user (step S286).

The controller 220 of the information processing apparatus 200 then transmit the generated drawing data to the projector apparatus 100 (step S288) and terminates the procedure.

The projector apparatus 100 projects high-resolution image on the screen SC based on the drawing data transmitted from the information processing apparatus 200. When the image display program is activated, the projected image is not necessarily an image selected by the user and may be the first image in the data file of the content, an image selected last time in the preceding content, or any other image determined in advance.

Figure 5:
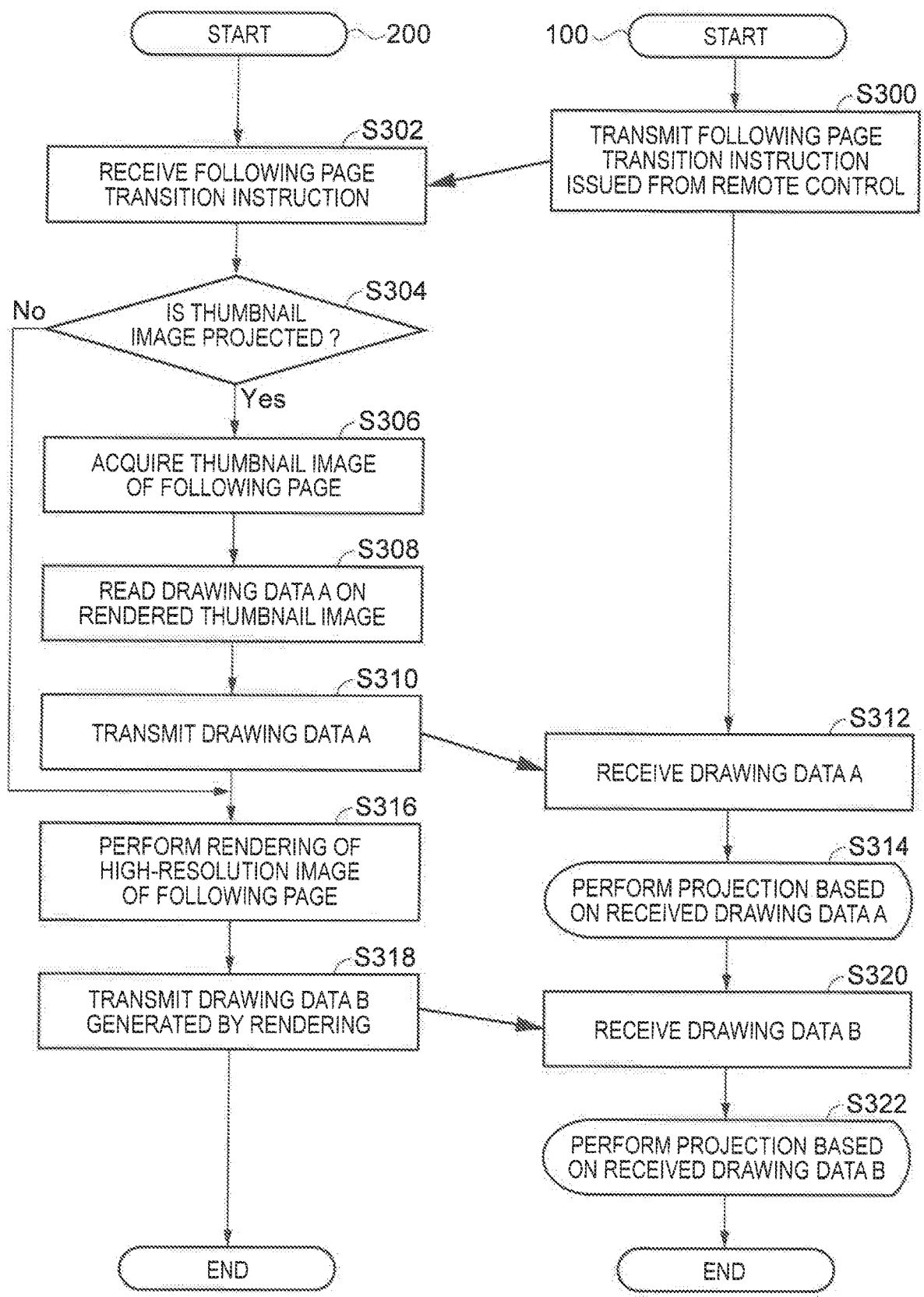
FIG. 5 is a flowchart showing the procedure of an image projection process.
Figure 6:
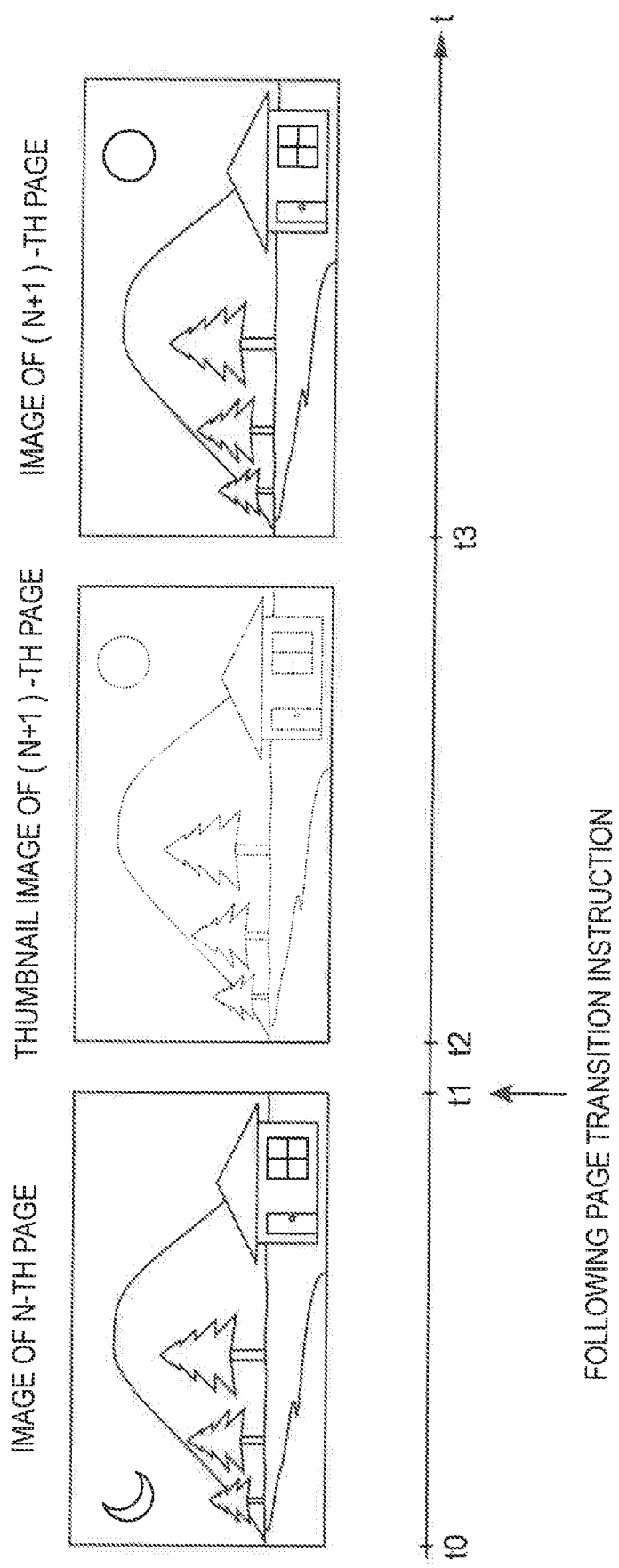
FIG. 6 shows changes in an image projected by a projector apparatus over time.

FIG. 5 is a flowchart showing the procedure of an image projection process carried out by the information processing apparatus 200 and the projector apparatus 100 (image display method) FIG. 6 shows changes in an image projected by the projector apparatus 100 over time.

Assume a case where after the information processing apparatus 200 is activated and the activation process shown in FIG. 4 is executed, the projector apparatus 100 displays a high-resolution image of the N-th page of a document file at time t0. A description will be made of the process in which the user operates the page switching button 6 on the remote control 5 in this state to cause the projector apparatus 100 to display a high-resolution image of the following page ((N+1)-th page).

First, in a state in which the projector apparatus 100 projects an image of the N-th page on the screen SC, when the user uses the page switching button 6 on the remote control 5 to issue an instruction to switch to the following page at time t1, the controller 160 of the projector apparatus 100 transmits a following page transition instruction to the information processing apparatus 200 based on the instruction to switch to the following page (step S300).

The information processing apparatus 200 receives the following page transition instruction transmitted from the projector apparatus 100 (step S302).

The controller 220 of the information processing apparatus 200 subsequently evaluates whether or not a thumbnail image of the following page ((N+1)-th page) is projected before the rendering is performed on the following page ((N+1)-th page) (step S304).

The evaluation of whether or not a thumbnail image is projected before a high-resolution image is projected may be performed based on the period necessary for the controller 220 to perform rendering of the high-resolution image.

For example, the evaluation may be performed based on the attribute of the content data being projected. For example, the evaluation may be performed based on the extension of a file (type of file) that contains the content data. Instead, the period required to perform rendering of the (N−1)-th page and preceding pages may be measured, and the evaluation may be performed based on the measured period. Still instead, in a case where partial rendering is performed, the evaluation may be performed based on the period required for the rendering performed on part of an image. Still instead, the evaluation may be performed based on the period required for the rendering of the thumbnail image.

Although not shown, the controller 220 of the information processing apparatus 200 may start the rendering of the following page (step S316), which will be described later, in a separate thread process, and in a case where the rendering is not completed in a predetermined period, the controller 220 may determine to project the thumbnail image.

In a case where the controller 220 of the information processing apparatus 200 determines in step S304 to project no thumbnail image (No), the controller 220 proceeds to step S316.

On the other hand, in a case where the controller 220 of the information processing apparatus 200 determines in step S304 to project the thumbnail image (Yes), the controller 220 of the information processing apparatus 200 reads and acquires the thumbnail image of the (N+1)-th page from the storage 230 (step S306).

The controller 220 of the information processing apparatus 200 reads drawing data A on the acquired thumbnail image having undergone the rendering from the storage 230 (step S308).

The controller 220 of the information processing apparatus 200 then transmits the drawing data A to the projector apparatus 100 (step S310).

The controller 220 of the information processing apparatus 200, when it produces the drawing data A, may produce the drawing data A that allows information, for example, a message formed of letters or a character, showing the user that the instruction of transition to the following page has been accepted to be superimposed on the thumbnail image and the resultant image to be displayed.

The projector apparatus 100 receives the drawing data A transmitted from the information processing apparatus 200 (step S312).

The controller 160 of the projector apparatus 100 subsequently projects the thumbnail image of the (N+1)-th page on the screen SC based on the drawing data. A received at time t2 (step S314). The user can therefore immediately visually recognize the low-resolution image projected on the screen SC.

On the other hand, having transmitted the drawing data A to the projector apparatus 100 in step S310, the controller 220 of the information processing apparatus 200, carries out step S316.

In step S316, the controller 220 of the information processing apparatus 200 acquires a High-resolution image of the following page and performs rendering of the acquired image of the following page.

The controller 220 of the information processing apparatus 200 then transmits drawing data B, which allows drawing of the high-resolution image, to the projector apparatus 100 (step S318) and terminates the procedure.

The projector apparatus 100 receives the drawing data B transmitted from the information processing apparatus 200 (step S320).

The controller 150 of the projector apparatus 100 subsequently projects the image of the (N+1)-th page on the screen SC based on the drawing data B received at time t3 (step S322) and terminates the procedure.

As described above, as compared with a long period required from the page transition operation of pressing the page switching button 6 on the remote control 5 at the time t1 to the projection of a high-resolution image of the following page at the time t3 (t3−t1), which is, for example, several tens of seconds, a short period is required to project a thumbnail image of the following page at the time t2 (t2−t1) which is not longer than one second. The user can therefore immediately check that the switching to the following page has been accepted through the operation of pressing the page switching button 6 on the remote control 5 although the thumbnail image is inferior to the high-resolution image in terms of resolution. As a result, there is no risk of wrong operation of pressing the page switching button 6 again because the user is not sure whether or not the switching to the following page has been accepted.

The embodiment described above provides the following effects.

(1) The information processing apparatus 200, when it accepts the page switching instruction from the remote control 5 of the projector apparatus 100, which is communicably connected to the information processing apparatus 200, first transmits thumbnail image data on a thumbnail image having been determined based on the switching instruction and having undergone rendering to the projector apparatus 100, then generates high-resolution image data having resolution higher than that of the thumbnail image in a rendering process, and transmits the generated image data to the projector apparatus 100. The projector apparatus 100 can therefore display the first received thumbnail image data for the period from the reception of the thumbnail image data to the reception of the high-resolution image data having higher resolution, so that the user can visually recognize that the page switching instruction has been accepted, whereby the user's wrong operation can be avoided, and user friendliness can therefore be improved.

(2) The external remoted control 5 can instruct the projector apparatus 100 to switch a projected image to another.

(3) Generating thumbnail image and thumbnail image data and storing them in the storage 230 allow the thumbnail image and the thumbnail image data to be quickly read and used as required.

(4) Since high-resolution image data is transmitted to the projector apparatus 100 based on the period required to generate the high-resolution image data in a rendering process without transmission of thumbnail image data to the projector apparatus 100, an image can be quickly displayed.

The invention has been described above based on the illustrated embodiment, but the invention is not limited to the present embodiment, and the following variations are conceivable.

(1) The projector apparatus 100 does not necessarily based on a method using liquid crystal panels, and it is conceivable to employ a DLP (digital light processing) method, an LCOS (liquid crystal on screen) method, or any other method.

(2) The display apparatus is not limited to the projector apparatus 100, which projects an image on the screen SC, and a variety of other display apparatus fall within the scope of the invention as follows: a liquid crystal monitor or a liquid crystal television that displays an image on a liquid crystal display panel; or a self-luminous display apparatus, such as a monitor apparatus or a television receiver that displays an image/image on a PDP (plasma display pane) and a monitor apparatus or a television receiver that displays an image/image on an organic EL display panel called, for example, OLED (organic light-emitting diode) and OEL (organic electro-luminescence).

Further, an apparatus using the approach described above is achieved by a single apparatus in some cases and achieved by the combination of a plurality of apparatus in other cases, that is, an apparatus using the approach has a variety of configurations. For example, an aspect in which the projector apparatus 100 and the information processing apparatus 200 are integrated with each other is also conceivable.

The invention may be configured in an aspect of a program executed by a computer provided in the information processing apparatus 200 described above to achieve the functions the information processing apparatus 200 described above, recording medium or which the program is so recorded as to be readable by a computer, or a transmission medium that transmits the program. The recording medium described above can be a magnetic optical recording medium or a semiconductor memory device. Specific examples of the recording medium may include a flexible disk, an HDD (hard disk drive), a CD-ROM (compact disk read only memory), a DVD (digital versatile disk), a Bluray (registered trademark) disc, a magneto-optical disk, a flash memory, and a portable recording medium, such as a card-shaped recording medium, or an immobile recording medium. The recording medium described above may instead be a RAM (random access memory), a ROM (read only memory), an HDD or any other nonvolatile storage device that is internal storage devices provided in each apparatus provided in the image display system 10 or in an external apparatus connected to the apparatus.

What is claimed is:

1. An information processing apparatus for use with a user, the information processing apparatus being communicably connected to an image display apparatus that is separate from the information processing apparatus, the information processing apparatus comprising:
a communication interface that communicates with the image display apparatus; and
a processor programmed to:
generate a thumbnail image from content data formed of a plurality of pages,
receive a page switching instruction from a user,
determine the thumbnail image based on the received page switching instruction,
evaluate whether or not the thumbnail image is transmitted to the image display apparatus,
in a first case when the thumbnail image data is evaluated as being transmitted to the image display apparatus: (i) transmit thumbnail image data corresponding to the determined thumbnail image to the image display apparatus via the communication interface, and (ii) generate high-resolution image data, which corresponds to the determined thumbnail image and has a resolution higher than a resolution of the determined thumbnail image, only after the image display apparatus has completely received the transmitted thumbnail image data,
in a second case when the thumbnail image data is evaluated as being not transmitted to the image display apparatus, generate high-resolution image data which corresponds to the determined thumbnail image and has a resolution higher than a resolution of the determined thumbnail image, and
transmit the generated high-resolution image data to the image display apparatus via the communication interface.

2. The information processing apparatus according to claim 1, wherein the processor acquires the switching instruction from an external apparatus.

3. The information processing apparatus according to claim 2, wherein the external apparatus is a remote control.

4. The information processing apparatus according to claim 1, further comprising
a memory storing the thumbnail image and the thumbnail image data,
wherein the processor reads the thumbnail image and the thumbnail image data stored in the memory.

5. The information processing apparatus according to claim 1, wherein the processor evaluates whether or not the thumbnail image data is transmitted to the image display apparatus based on a period required to generate the high-resolution image data.

6. A non-transitory computer readable recording medium storing a program executable by a computer that causes an image display apparatus communicably connected to the computer to display an image, the image display apparatus being separate from the computer, the program causing the computer to perform steps comprising:
generating a thumbnail image from content data formed of a plurality of pages,
accepting a page switching instruction,
determining the thumbnail image based on the switching instruction,
evaluating whether or not the thumbnail image is transmitted to the image display apparatus,
in a first case when the thumbnail image data is evaluated as being transmitted to the image display apparatus: (i) transmitting thumbnail image data corresponding to the determined thumbnail image to the image display apparatus via the communication interface, and (ii) generating high-resolution image data, which corresponds to the determined thumbnail image and has a resolution higher than a resolution of the determined thumbnail image, only after the image display apparatus has completely received the transmitted thumbnail image data, in a second case when the thumbnail image data is evaluated as being not transmitted to the image display apparatus, generating high-resolution image data which corresponds to the determined thumbnail image and has a resolution higher than a resolution of the determined thumbnail image, and transmitting the generated high-resolution image data to the image display apparatus.

7. An image display method for causing an information processing apparatus that is communicably connected to an image display apparatus to display an image, the image display apparatus being separate from the information processing apparatus, the method comprising:

generating a thumbnail image from content data formed of a plurality of pages;

determining, upon acceptance of a page switching instruction, the thumbnail image based on the switching instruction;

evaluating whether or not the thumbnail image is transmitted to the image display apparatus;

in a first case when the thumbnail image data is evaluated as being transmitted to the image display apparatus: (i) transmitting thumbnail image data corresponding to the determined thumbnail image to the image display apparatus via the communication interface, and (ii) generating high-resolution image data, which corresponds to the determined thumbnail image and has a resolution higher than a resolution of the determined thumbnail image, only after the image display apparatus has completely received the transmitted thumbnail image data, in a second case when the thumbnail image data is evaluated as being not transmitted to the image display apparatus, generating high-resolution image data which corresponds to the determined thumbnail image and has a resolution higher than a resolution of the determined thumbnail image; and transmitting the generated high-resolution image data to the image display apparatus.

8. A display system communicably connected to an image display apparatus that is separate from the display system, the display system comprising:

an information processing apparatus including:
a communication interface that communicates with the image display apparatus; and
a processor programmed to:
generate a thumbnail image from content data formed of a plurality of pages,
receive a page switching instruction from a user,
determine the thumbnail image based on the received page switching instruction,
evaluate whether or not the thumbnail image is transmitted to the image display apparatus,
in a first case when the thumbnail image data is evaluated as being transmitted to the image display apparatus: (i) transmit thumbnail image data corresponding to the determined thumbnail image to the image display apparatus via the communication interface, and (ii) generate high-resolution image data, which corresponds to the determined thumbnail image and has a resolution higher than a resolution of the determined thumbnail image, only after the image display apparatus has completely received the transmitted thumbnail image data,
in a second case when the thumbnail image data is evaluated as being not transmitted to the image display apparatus, generate high-resolution image data which corresponds to the determined thumbnail image and has a resolution higher than a resolution of the determined thumbnail image, and
transmit the generated high-resolution image data to the image display apparatus via the communication interface; and the image display apparatus including:
a network interface connected to the information processing apparatus, and being configured to receive the image data from the information processing apparatus, and
a display section that displays an image based on the received image data.

* * * * *